(12) United States Patent
Gandelsman et al.

(10) Patent No.: US 10,445,192 B2
(45) Date of Patent: Oct. 15, 2019

(54) EFFICIENT BACKUP AND RESTORE OF CONTROLLER CODE IN INDUSTRIAL CONTROL NETWORK

(71) Applicant: Indegy Ltd., Tel Aviv (IL)

(72) Inventors: Mille Gandelsman, Ramat Hasharon (IL); Avihay Kain, Tel Aviv (IL); Stanislav Mushkin, Ramat Gan (IL)

(73) Assignee: Indegy Ltd., Tel Aviv (IL)

( * ) Notice: Subject to any disclaimer, the term of this patent is extended or adjusted under 35 U.S.C. 154(b) by 487 days.

(21) Appl. No.: 15/402,253

(22) Filed: Jan. 10, 2017

(65) Prior Publication Data

US 2018/0196615 A1    Jul. 12, 2018

(51) Int. Cl.
*G06F 16/00* (2019.01)
*G06F 11/14* (2006.01)

(52) U.S. Cl.
CPC ...... *G06F 11/1469* (2013.01); *G06F 11/1464* (2013.01)

(58) Field of Classification Search
CPC .... G06F 16/11; G06F 16/122; G06F 11/1464; G06F 11/1466; G06F 11/1469; G06F 11/1446; G06F 11/1451; G06F 11/1456
See application file for complete search history.

(56) References Cited

U.S. PATENT DOCUMENTS

| | | | | |
|---|---|---|---|---|
| 7,086,049 B2* | 8/2006 | Goodman | ............... | G06F 8/656 717/168 |
| 7,185,191 B2* | 2/2007 | Bosley | ............... | G06F 11/1433 713/1 |
| 10,261,489 B2* | 4/2019 | Gandelsman | ........ | G05B 19/058 |
| 2004/0139294 A1* | 7/2004 | Colvig | ............... | G06F 11/1464 711/162 |
| 2006/0277524 A1* | 12/2006 | Goodman | ................ | G06F 8/65 717/106 |
| 2013/0339307 A1* | 12/2013 | Berstler | ............. | G06F 11/1453 707/654 |
| 2014/0032862 A1* | 1/2014 | Bower, III | ......... | G06F 11/1448 711/162 |

(Continued)

OTHER PUBLICATIONS

Rockwell Automation, "ControlLogix System", User manual, 212 pages (pp. 60-62, section 'Upload from the controller'), year 2014.

(Continued)

*Primary Examiner* — Cheryl Lewis
(74) *Attorney, Agent, or Firm* — Kligler & Associates

(57) ABSTRACT

An apparatus includes a memory and a processor. The memory is configured to store one or more backup images of code of one or more controllers that control field devices in an industrial control network, the controllers support a transaction type that returns a backup image to an engineering station. The processor is configured to communicate with the engineering station by emulating toward the engineering station a dummy controller that controls no field devices, to receive from the engineering station a request, in accordance with the transaction type, to provide a given backup image of a given controller selected from among the controllers in the industrial control network, and in response to the request, to send the given backup image to the engineering station in accordance with the transaction type.

17 Claims, 3 Drawing Sheets

(56) References Cited

U.S. PATENT DOCUMENTS

2016/0306337 A1   10/2016   Gandelsman et al.

OTHER PUBLICATIONS

Siemens, "SIMATIC—Programming with STEP 7", Manual, edition 3, 650 pages (pp. 397-401, section 19.3), year 2006.
Aspete, "Introduction to Programmable Logic Controllers (PLCs)—Industrial Control Systems", 47 pages, MME 486, Fall 2006.

* cited by examiner

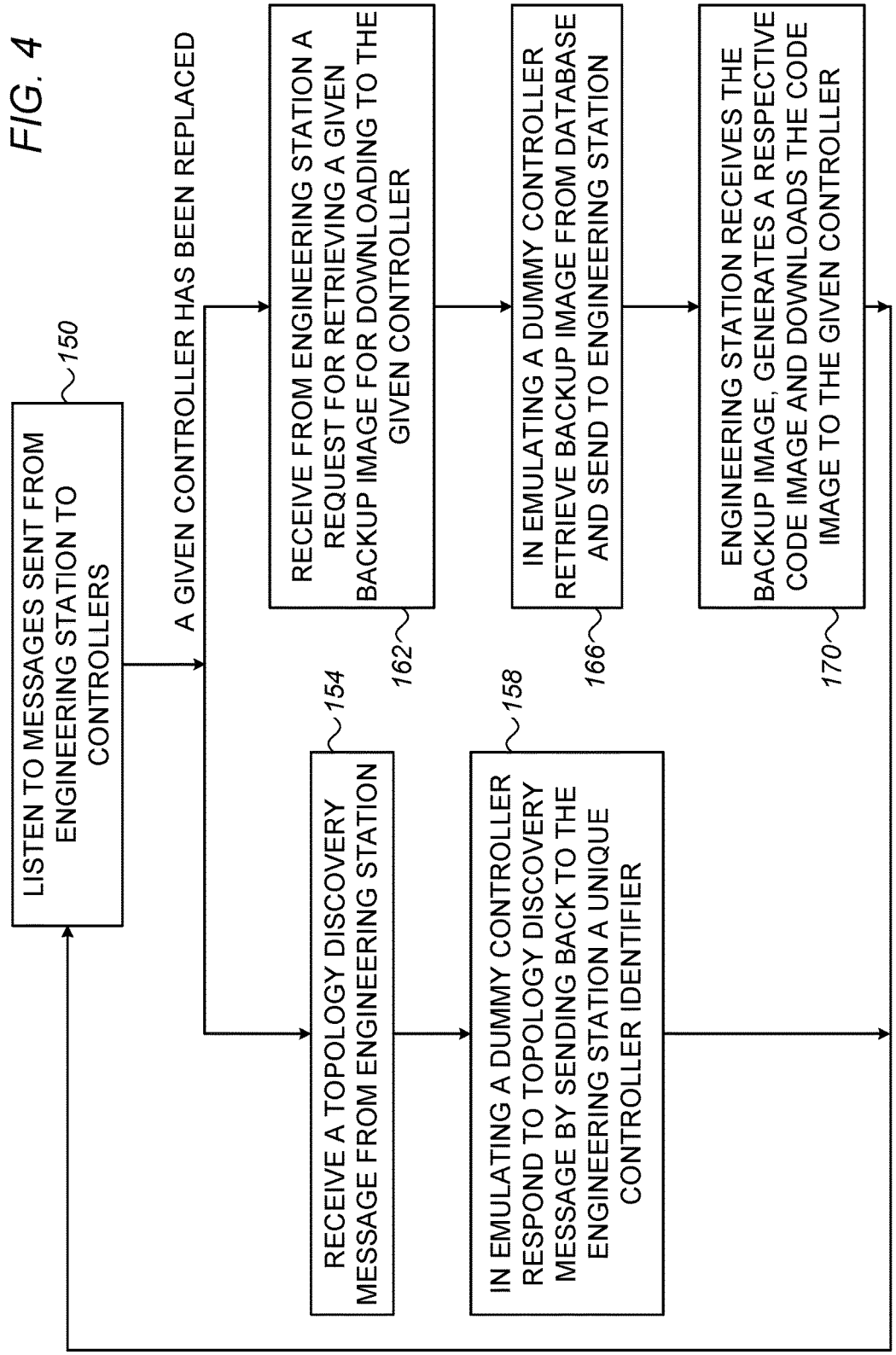

EFFICIENT BACKUP AND RESTORE OF CONTROLLER CODE IN INDUSTRIAL CONTROL NETWORK

TECHNICAL FIELD

Embodiments described herein relate generally to network management, and particularly to methods and systems for managing industrial networks.

BACKGROUND

Industrial Control Systems (ICSs) typically comprise Programmable Logic Controllers (PLCs) that control various field devices. A typical PLC can be configured with suitable logic and parameters for operating the field devices to implement a desired industrial process. PLCs are described, for example, in "Introduction to Programmable Logic Controllers (PLCs)—Industrial Control Systems," 2006, which is incorporated herein by reference.

SUMMARY

An embodiment that is described herein provides an apparatus that includes a memory and a processor. The memory is configured to store one or more backup images of code of one or more controllers that control field devices in an industrial control network, the controllers support a transaction type that returns a backup image to an engineering station. The processor is configured to communicate with the engineering station by emulating toward the engineering station a dummy controller that controls no field devices, to receive from the engineering station a request, in accordance with the transaction type, to provide a given backup image of a given controller selected from among the controllers in the industrial control network, and in response to the request, to send the given backup image to the engineering station in accordance with the transaction type.

In some embodiments, the processor has no access to controller-specific information, which is available to the engineering station and is required for generating downloadable code images, and the processor is configured to send the given backup image to the engineering station, for generating a respective code image using controller-specific parameters of the given controller. In other embodiments, the processor is configured to cause downloading of the code image to the given controller, even though the processor is unauthorized to download code images to the controllers, by providing the corresponding backup image to the engineering station. In yet other embodiments, the processor is configured to receive the request after the controller has been replaced or fixed.

In an embodiment, the processor is configured to communicate with the controllers by emulating toward the controllers the engineering station, to retrieve backup images from the controllers in accordance with the transaction type, and to store the retrieved backup images in the memory. In another embodiment, the processor is configured to retrieve one or more versions of the given backup image before receiving the request from the engineering station. In yet another embodiment, the processor is configured to compare between the given backup image and a version of the given backup image previously retrieved from the given controller and stored in the memory, and to issue a notification upon detecting a discrepancy between the retrieved backup image and the stored backup image.

In some embodiments, the controllers further support another transaction type that returns a controller identifier to the engineering station, and the processor is configured to receive a topology discovery message from the engineering station, in accordance with the another transaction type, and in response to the topology discovery message, to send to the engineering station, in accordance with the another transaction type, a unique controller identifier that is unused by any controller in the industrial control network.

There is additionally provided, in accordance with an embodiment that is described herein, a method, including, in a processor that stores in a memory one or more backup images of code of one or more controllers that control field devices in an industrial control network, the controllers support a transaction type that returns a backup image to an engineering station, communicating with the engineering station by emulating toward the engineering station a dummy controller that controls no field devices. A request is received from the engineering station, in accordance with the transaction type, to provide a given backup image of a given controller selected from among the controllers in the industrial control network. In response to the request, the given backup image is sent to the engineering station in accordance with the transaction type.

There is additionally provided, in accordance with an embodiment that is described herein, an apparatus that includes an engineering station and an appliance. The engineering station is configured to manage one or more controllers that control field devices in an industrial control network, the controllers support a transaction type that returns a backup image of a code of a controller to the engineering station. The appliance includes a memory and a processor. The memory is configured to store one or more backup images of the controllers. The processor is configured to communicate with the engineering station by emulating toward the engineering station a dummy controller that controls no field devices, to receive from the engineering station a request, in accordance with the transaction type, to provide a given backup image of a given controller selected from among the controllers in the industrial control network, and in response to the request, to send the given backup image to the engineering station in accordance with the transaction type.

These and other embodiments will be more fully understood from the following detailed description of the embodiments thereof, taken together with the drawings in which:

BRIEF DESCRIPTION OF THE DRAWINGS

FIG. 4 is a flow chart that schematically illustrates a method for restoring controller code, in accordance with an embodiment that is described herein.

DETAILED DESCRIPTION OF EMBODIMENTS

Overview

Figure 1:
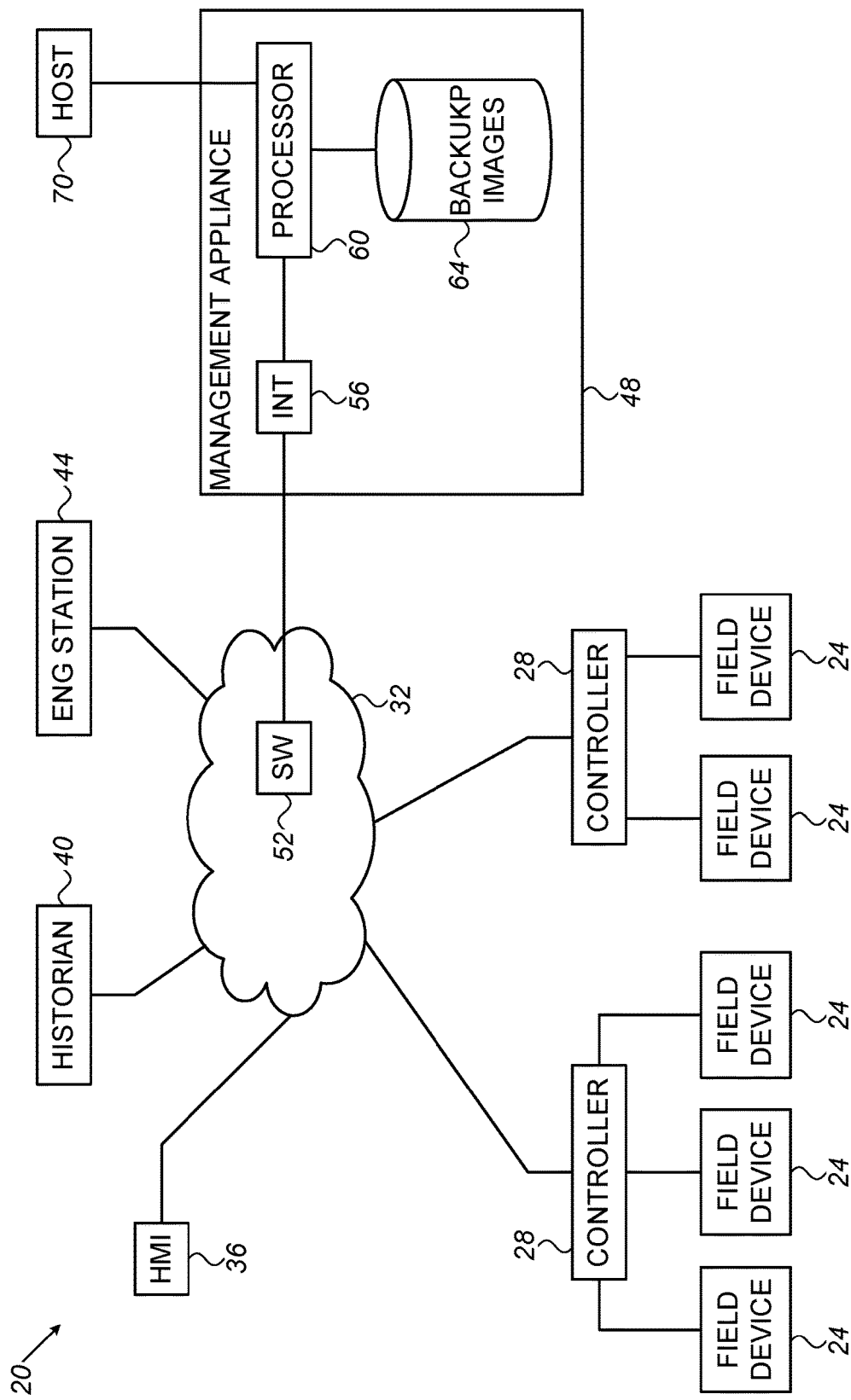
FIG. 1 is a block diagram that schematically illustrates an industrial control network, in accordance with an embodiment that is described herein.

Embodiments that are described herein provide improved methods and systems for managing industrial control networks. In a typical industrial control network, one or more controllers implement a desired industrial process by controlling field devices. Each controller typically runs code, which comprises firmware, application logic and/or configuration parameters. The firmware is typically installed by the controller manufacturer, whereas the application logic and configuration parameters are typically configured in accordance with the specific industrial process being performed. The industrial control network is also referred to as an "industrial network," for brevity.

The industrial network typically comprises an engineering station for configuring and maintaining the network. A conventional engineering station typically supports only manual backup of the controllers' code, which imposes a heavy burden on technical staff. The engineering station is typically the only entity in the industrial network that has a network software stack suitable for (and therefore the engineering station is the only entity authorized to) downloading code to the controllers, e.g., when a new controller is added to the industrial network, or after a faulty controller has been replaced or fixed.

An image retrieved from a controller for backup is, however, unsuitable for re-installing as-is in another controller, because certain parameters in the image are controller-specific and must be set ("personalized") accordingly. In the description that follows, a code version retrieved from a controller is referred to herein as a "backup image," and a code version that is suitable for installing by the controller, after personalization, is referred to herein as a "code image."

In the disclosed embodiments, the industrial network comprises a management appliance, which handles automatic backup of the controllers' code. The management appliance reads and backs-up the controllers' code by emulating the engineering station vis-à-vis the controllers. Towards the engineering station, (after backing-up at least one of the controllers) the management appliance emulates a dummy controller that controls no field devices, and in this manner provides the engineering station backup images upon request.

In a typical flow, the management appliance receives from the engineering station a request to provide a given backup image of a given controller, and the appliance impersonates this controller toward the engineering station over the network, as described herein. The request conforms to the same transaction protocol used for communicating between the engineering station and the controllers. In response, the management appliance retrieves the given backup image from its database, and sends the given backup image to the engineering station, again using the same transaction protocol used for communicating between the engineering station and the controllers. The engineering station generates from the backup image a downloadable code image, including setting controller-specific information that is typically inaccessible by the appliance, and downloads the generated code image to the given controller.

In some embodiments, the management appliance retrieves from each controller one or more backup images and stores them in the database. The management appliance may retrieve a backup image from each controller periodically, e.g., once per day, or at any other suitable rate.

In some embodiments, the backup images retrieved from the controllers are used for various other purposes. For example, the backup images can be used as baseline code versions for detecting mis-configurations and/or hostile attacks on a controller, as described, for example, in U.S. patent application Ser. No. 14/686,878, which is assigned to the assignee of the present patent application.

The controllers in the industrial network are identified using respective controller identifiers. A controller identifier may comprise, for example, an IP address assigned to the controller, or any other suitable identifier. Typically, the engineering station broadcasts topology discovery messages in order to learn which controllers exist in the network. In some embodiments, the management appliance responds to the topology discovery messages by returning a unique controller identifier that is unused by any controller in the industrial network. Subsequently, the management appliance and the engineering station communicate using this identifier, e.g., for providing backup images.

System Description

FIG. 1 is a block diagram that schematically illustrates an industrial control network 20, in accordance with an embodiment that is described herein. Network 20 typically controls field devices 24 that carry out a desired industrial process in some industrial environment, e.g., a factory production line, a power plant, a chemical plant or any other suitable environment.

In the example of FIG. 1, network 20 comprises one or more field devices 24 that are controlled by one or more controllers 28. Field devices 24 typically comprise electromechanical devices that perform actions such as, for example, opening and closing valves, controlling electrical relays and circuit breakers, collecting data from environmental sensors, monitoring alarm conditions and other events, or any other suitable action.

Controllers 28 may comprise, for example, Programmable Logic Controllers (PLCs). Each controller 28 typically controls one or more of field devices 24. A controller typically communicates with a field device using a suitable (e.g., serial) interface so as to instruct the field device to perform various actions and/or to collect data and measurements from the field device.

Controllers 28 are typically connected by a Local Area Network (LAN) 32. LAN 32 may be wired and/or wireless, and may operate in accordance with any suitable communication protocol, e.g., Ethernet. Additional network nodes that may be connected to LAN 32 comprise, for example, a Human-Machine Interface (HMI) station 36, a historian 40 and an engineering station 44.

HMI station 36 is used by an operator for monitoring and controlling the industrial process via controllers 28. Historian 40 is used for collecting and logging relevant data relating to the process for later analysis. Engineering station 44 is used by technical staff for controlling and configuring network 20, and particularly controllers 28.

In the disclosed embodiments, network 20 further comprises a management appliance 48. Appliance 48 retrieves images of the controllers' code and stores the retrieved images for backup.

A backup image typically comprises at least one of the controller's (i) firmware, (ii) application logic and (iii) configuration parameters. Engineering station 44 receives (in response to a suitable request) a given backup image from appliance 48, processes the backup image to generate a code image, and downloads the code image to the controller. The engineering station generates the code image from the backup image based on controller-specific parameters such as a MAC address, IP address, controller version, and the like. The functionality of appliance 48 is described in detail further below.

In the example of FIG. 1, management appliance 48 comprises a network interface 56 for connecting to LAN 32.

In the present example, although not necessarily, appliance 48 is connected to a network switch 52 or other network element in LAN 32. Appliance 48 further comprises a processor 60 that is configured to carry out the methods described herein, and a database 64 that is configured to store one or more backup images of the controller firmware, application logic and/or configuration parameters. In some embodiments, processor 60 uses these backup images for additional purposes such as for detecting possible misconfigurations of controllers 28 and/or hostile attacks on the controllers.

Network 20 further comprises a host computer 70 for managing the management appliance. For example, an operator can configure the appliance with a unique controller identifier, instead of using the topology discovery broadcast message described above. The host can also be used for managing database 64 and for selecting backup images to be sent to the engineering station. In some embodiments, the functionalities of host 70 and engineering station 44 are implemented in a single computer in network 20.

The configurations of network 20 and management appliance 48 shown in FIG. 1 are example configurations, which are chosen purely for the sake of conceptual clarity. In alternative embodiments, any other suitable configurations can be used for network 20 and/or appliance 48. For example, management appliance 48 may be implemented on a standalone server or other platform, as software running on an existing platform such as engineering station 44, or in any other suitable way. Typically, however, appliance 48 is implemented as a separate trusted platform that is independent of other network elements and is therefore less susceptible to attack. In an embodiment, appliance 48 may be implemented as a virtual appliance that runs on a hypervisor in network 20.

The different elements of appliance 48 may be implemented using suitable software, using hardware, e.g., using one or more Application-Specific Integrated Circuits (ASICs) or Field-Programmable Gate Arrays (FPGAs), or using a combination of software and hardware elements. Database 64 may be implemented using any suitable memory, such as a solid-state or magnetic storage device.

Typically, processor 60 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Data Flows Related to Code Backup and Restore

Figure 2:
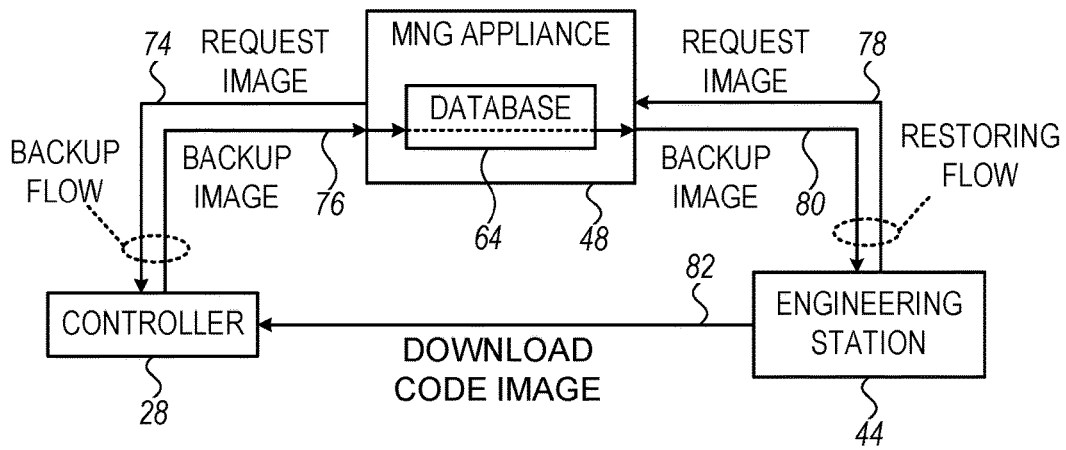
FIG. 2 is a diagram that schematically illustrates data flows related to backup and restore of controller code, in accordance with an embodiment that is described herein.

FIG. 2 is a diagram that schematically illustrates data flows related to backup and restore of controller code, in accordance with an embodiment that is described herein. In the figure, numbered arrows represent message transactions exchanged among engineering station 44, management appliance 48 and a selected controller 28.

A backup cycle typically begins with appliance 48 requesting the controller (arrow 74) for an image of the controller code for backup. The controller responses (arrow 76) by returning the currently used code version to the appliance, which stores the image for backup in database 64. Note that the appliance retrieves the controller code directly, i.e., without the engineering station being involved. Note that the engineering station retrieves the backup image indirectly, i.e., via the management appliance.

The restoring flow begins with engineering station 44 requesting from appliance 48 (arrow 78) to provide a backup image that was previously stored in the data base. The appliance responds (arrow 80) by providing the requested backup image to the engineering station.

The engineering station generates from the backup image a respective code image suitable to be downloaded to the controller in question. The engineering station downloads the generated code image to the controller (arrow 82), which installs the code image and executes it to control its field devices 24.

Retrieving Controller Code for Backup

Figure 3:
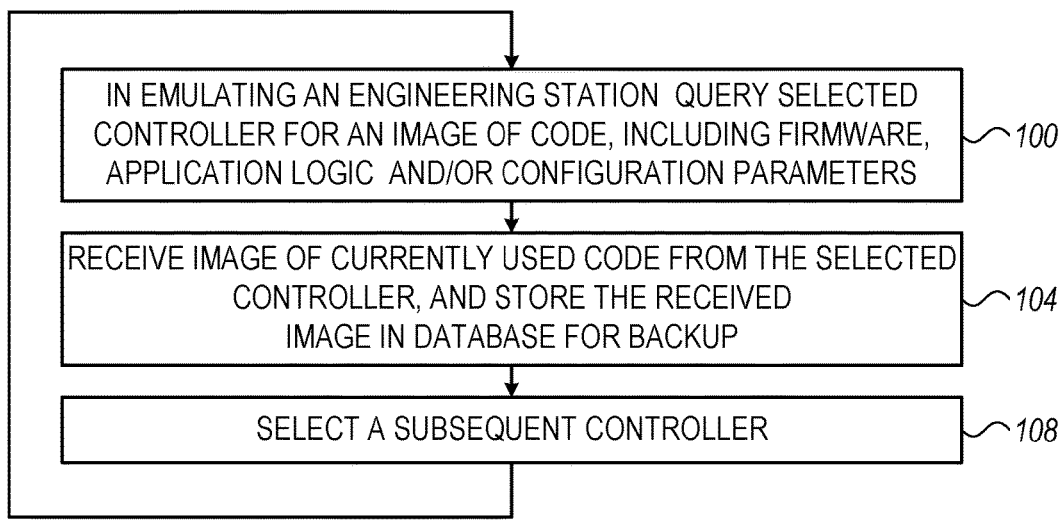
FIG. 3 is a flow chart that schematically illustrates a method for retrieving controller code for backup, in accordance with an embodiment that is described herein.

FIG. 3 is a flow chart that schematically illustrates a method for retrieving controller code for backup, in accordance with an embodiment that is described herein. The method is executed by processor 60 of appliance 48. For retrieving controller code for backup, the processor employs a transaction type supported by the controllers, which returns a backup image to the engineering station in response to a suitable request.

The method begins with processor 60 querying a selected controller to report an image of the controller code. In an embodiment, the processor holds a list of the controllers in the industrial network, and queries the controllers sequentially. To query a given controller, the processor emulates toward the controller the engineering station by sending to the controller a suitable request over LAN 32. The controller responds to the request by returning to the processor an image of the currently used code, over LAN 32.

At an image reception step 104, the processor receives the image retuned and stores the image in database 64. The processor stores the backup images with identification and indexing information so that a specific image can be later requested. In some embodiments, the most recently backup image retrieved is stored in place of a previously retrieved backup image from the same controller. In other embodiments, the processor stores multiple versions of the backup images for each controller.

At a selection step 108, the processor selects a subsequent controller from among the controllers of the industrial network, and the method loops back to step 100 to request a subsequent image.

The method of FIG. 3 is typically used for repeatedly retrieving images for backup from each of the controllers. For example, the processor can retrieve an updated image from each of the controllers once per day, or at any other suitable rate.

Methods for Restoring Controller Code

FIG. 4 is a flow chart that schematically illustrates a method for restoring controller code, in accordance with an embodiment that is described herein.

The method begins with processor 60 emulating a dummy controller toward engineering station 44 by listening to messages sent from the engineering station to controllers 28 over LAN 32, at a listening step 150. Specifically, the processor is configured to receive messages that are destined to the controllers such as a topology discovery message and requests to provide backup images.

At a discovery message reception step 154, the processor receives a topology discovery message that was broadcast by the engineering station. The processor responds to the topology discovery massage by presenting the processor to the engineering station as if it were a real controller. Specifically, at step 158, the processor responds to the topology discovery massage with the same type of response used by controllers 28, including a unique controller identifier that is unused by any of the controllers in the industrial network. Using the unique controller identifier, the engineering station can request the processor to provide a backup image, as will be described below. Following step 158 the method loops back to step 150 to listen to subsequent messages.

At an image requesting step 162, the processor receives from the engineering station a request to provide a given backup image of a given controller. Typically, the engineering station requests a backup image after the given controller (or an element thereof) has failed and has been replaced or fixed. Alternatively or additionally, the engineering station may request a backup image for security reasons, such as when the code of the controller may have been tampered with, or for any other reason.

At a backup image reporting step 166, the processor retrieves the given backup image from database 64, and sends the retrieved backup image to the engineering station.

At a recovery step 170, the engineering station receives the requested backup image from the processor, and generates a respective code image suitable for the given controller. The engineering station then downloads the code image to the given controller.

Generating the code image and downloading the code image to the controller can be carried out in various ways. For example, an operator of the engineering station builds a software project based on the backup image received from the processor. The operator may provide the engineering station with controller-specific information that is required for compiling the project to produce a code image suitable for the given controller. The operator then compiles the project, and initiates using the engineering station a download operation that sends the resulting code image to the given controller. Alternatively, any other suitable method, e.g., automatic or semi-automatic, can be used for generating and/or downloading the code image.

Following step 170 the method loops back to step 100, to listen to subsequent messages.

The embodiments described are given by way of example, and other suitable embodiments can also be used.

For example, in the method of FIG. 4, the processor identifies itself to the engineering station as a dummy controller by responding to a topology discovery massage with a unique controller identifier. In alternative embodiments, an operator may provision the processor with a unique controller identifier (e.g., using host 70) that is also known to the engineering station.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a memory, which is configured to store one or more backup images of code of one or more controllers that control field devices in an industrial control network, wherein the controllers support a transaction type that returns a backup image to an engineering station; and
a processor, which is configured to:
communicate with the engineering station by emulating toward the engineering station a dummy controller that controls no field devices;
receive from the engineering station a request, in accordance with the transaction type, to provide a given backup image of a given controller selected from among the controllers in the industrial control network; and
in response to the request, send the given backup image to the engineering station in accordance with the transaction type.

2. The apparatus according to claim 1, wherein the processor has no access to controller-specific information, which is available to the engineering station and is required for generating downloadable code images, and wherein the processor is configured to send the given backup image to the engineering station, for generating a respective code image using controller-specific parameters of the given controller.

3. The apparatus according to claim 2, wherein the processor is configured to cause downloading of the code image to the given controller, even though the processor is unauthorized to download code images to the controllers, by providing the corresponding backup image to the engineering station.

4. The apparatus according to claim 1, wherein the processor is configured to receive the request after the controller has been replaced or fixed.

5. The apparatus according to claim 1, wherein the processor is configured to communicate with the controllers, by emulating toward the controllers the engineering station, to retrieve backup images from the controllers, in accordance with the transaction type, and to store the retrieved backup images in the memory.

6. The apparatus according to claim 5, wherein the processor is configured to retrieve one or more versions of the given backup image before receiving the request from the engineering station.

7. The apparatus according to claim 5, wherein the processor is configured to compare between the given backup image and a version of the given backup image previously retrieved from the given controller and stored in the memory, and to issue a notification upon detecting a discrepancy between the retrieved backup image and the stored backup image.

8. The apparatus according to claim 1, wherein the controllers further support another transaction type that returns a controller identifier to the engineering station, and wherein the processor is configured to receive a topology discovery message from the engineering station, in accordance with the another transaction type, and in response to the topology discovery message, to send to the engineering station, in accordance with the another transaction type, a unique controller identifier that is unused by any controller in the industrial control network.

9. A method, comprising:
in a processor that stores in a memory one or more backup images of code of one or more controllers that control field devices in an industrial control network, wherein the controllers support a transaction type that returns a backup image to an engineering station, communicating with the engineering station by emulating toward the engineering station a dummy controller that controls no field devices;

receiving from the engineering station a request, in accordance with the transaction type, to provide a given backup image of a given controller selected from among the controllers in the industrial control network; and in response to the request, sending the given backup image to the engineering station in accordance with the transaction type.

10. The method according to claim 9, wherein the processor has no access to controller-specific information, which is available to the engineering station and is required for generating downloadable code images, and wherein sending the given backup image to the engineering station comprises sending the given backup image, for generating a respective code image using controller-specific parameters of the given controller.

11. The method according to claim 10, and comprising causing, by the processor, downloading of the code image to the given controller, even though the processor is unauthorized to download code images to the controllers, by providing the corresponding backup image to the engineering station.

12. The method according to claim 9, wherein receiving the request comprises receiving the request after the controller has been replaced or fixed.

13. The method according to claim 9, and comprising communicating with the controllers, by emulating toward the controllers the engineering station, retrieving backup images from the controllers in accordance with the transaction type, and storing the retrieved backup images in the memory.

14. The method according to claim 13, wherein retrieving the backup images comprises retrieving one or more versions of the given backup image before receiving the request from the engineering station.

15. The method according to claim 13, and comprising comparing between the given backup image and a version of the given backup image previously retrieved from the given controller and stored in the memory, and issuing a notification upon detecting a discrepancy between the retrieved backup image and the stored backup image.

16. The method according to claim 9, wherein the controllers further support another transaction type that returns a controller identifier to the engineering station, and wherein the method further comprises receiving a topology discovery message from the engineering station, in accordance with the another transaction type, and in response to the topology discovery message, sending to the engineering station, in accordance with the another transaction type, a unique controller identifier that is unused by any controller in the industrial control network.

17. An apparatus, comprising:
an engineering station, which is configured to manage one or more controllers that control field devices in an industrial control network, wherein the controllers support a transaction type that returns a backup image of a code of a controller to the engineering station; and
an appliance comprising:
a memory, which is configured to store one or more backup images of the controllers; and
a processor, which is configured to:
communicate with the engineering station by emulating toward the engineering station a dummy controller that controls no field devices;
receive from the engineering station a request, in accordance with the transaction type, to provide a given backup image of a given controller selected from among the controllers in the industrial control network; and
in response to the request, send the given backup image to the engineering station in accordance with the transaction type.

\* \* \* \* \*